US007546465B2

(12) United States Patent
Kent, Jr. et al.

(10) Patent No.: US 7,546,465 B2
(45) Date of Patent: *Jun. 9, 2009

(54) INSTANT MESSAGING PRIVATE TAGS

(75) Inventors: Larry G. Kent, Jr., Loganville, GA (US); W. Todd Daniell, Marietta, GA (US); Joel A. Davis, Marietta, GA (US); Brian K. Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 924 days.

This patent is subject to a terminal disclaimer.

(21) Appl. No.: 10/368,099

(22) Filed: Feb. 18, 2003

(65) Prior Publication Data

US 2004/0078595 A1 Apr. 22, 2004

Related U.S. Application Data

(60) Provisional application No. 60/419,613, filed on Oct. 17, 2002.

(51) Int. Cl.
*H04L 9/00* (2006.01)

(52) U.S. Cl. ............... 713/176; 713/168; 713/150

(58) Field of Classification Search ............. 713/193, 713/176, 186, 160, 150, 166, 182, 171, 170; 726/27–28, 1–2, 4; 380/259, 261, 274
See application file for complete search history.

(56) References Cited

U.S. PATENT DOCUMENTS

| 5,872,521 | A | 2/1999 | Lopatukin et al. | |
|---|---|---|---|---|
| 6,941,459 | B1 * | 9/2005 | Hind et al. | 713/167 |
| 6,990,513 | B2 * | 1/2006 | Belfiore et al. | 709/203 |
| 7,315,867 | B2 * | 1/2008 | Kobayashi et al. | 707/102 |
| 2002/0016718 | A1 * | 2/2002 | Rothschild et al. | 705/2 |
| 2002/0038289 | A1 * | 3/2002 | Lawlor et al. | 705/42 |
| 2003/0046273 | A1 * | 3/2003 | Deshpande | 707/3 |

OTHER PUBLICATIONS

Sugano et al, CPIM Presence Information Data Format, Oct. 2001, Network Working Group Internet draft, pp. 1-13.*
Portmann et al., Selective Security for TLS, 2001, IEEE, pp. 216-221.*
Hamner et al., Email as a Tool for Sharing Binary Files among Scientists, J. Chem. Inf. Comput. Sci., 1994, vol. 34, pp. 480-484.*
Neuman et. al., Kerberos: An Authentication Service for Computer Networks, 1994, IEEE, vol. 32, pp. 33-38.*
Author(s): M. Day, et al.; Title: A model for Presence and Instant Messaging; Feb. 2000; pp. 1-17.
W3C; Title: Extensible Markup Language (XML( 1.0 (Second Edition), W3C Recommendation; Oct. 6, 2000; pp. 1-59.
Author(s): M. Day, et al.; Instant Messaging / Presence Protocol Requirements; Feb. 2000; pp. 1-26.
Author(s): Miller et al.; Title: XMPP Instant Messaging, draft-miller-xmpp-im-00; Jun. 21, 2002; pp. 1-32.

(Continued)

*Primary Examiner*—Pramila Parthasarathy

(57) ABSTRACT

Systems for instant messaging private tags preferably comprise a parser for parsing an instant message for sensitive data and an encryption engine for encrypting the sensitive data. A modified uuencoder is also preferably included for converting the encrypted sensitive data into a data stream that complies with an XML format. Other systems and methods are also provided.

21 Claims, 10 Drawing Sheets

OTHER PUBLICATIONS

Website: http://www.ceruleanstudios.com/trillian/features-1.html; Cerulean Studios Trillian; printed Apr. 23, 2003; pps. include: Features Tour, Messaging Enhancements, Interface Overview, Connect to 5 Mediums, and 3 individual Feature tours; © 1999-2003. Applicant's Statement in IDS.

Kent; U.S. Appl. No. 10/368,197, filed Feb. 18, 2003.

Kent; Non-Final Rejection mailed Oct. 10, 2006; U.S. Appl. No. 10/368,197, filed Feb. 18, 2003.

Kent; Final Rejection mailed Mar. 9, 2007; U.S. Appl. No. 10/368,197, filed Feb. 18, 2003.

Kent; Advisory Action mailed Jun. 7, 2007; U.S. Appl. No. 10/368,197, filed Feb. 18, 2003.

Kent; Non- Final Rejection mailed Sep. 20, 2007; U.S. Appl. No. 10/368,197, filed Feb. 18, 2003.

* cited by examiner

FIG. 4A

402 → <ROOT>
404 →    <MESSAGE>
406 →       TODD'S ACCT: 123-456
408 →    </MESSAGE>
410 → </ROOT>

FIG. 4B

402 → <ROOT>
404 →    <MESSAGE>
407 →       TODD'S ACCT:
409 →         <PRIVATE ENC="BLOWFISH" KEY ID=TODD">
412 →           %#159
414 →         </PRIVATE>
408 →    </MESSAGE>
410 → </ROOT>

INSTANT MESSAGING PRIVATE TAGS

CROSS-REFERENCE TO RELATED APPLICATION

This application claims priority to U.S. provisional application entitled, "Message Abstraction Systems," having Ser. No. 60/419,613, filed Oct. 17, 2002, which is entirely incorporated herein by reference.

TECHNICAL FIELD

The present invention is generally related to communications and, more particularly, is related to an instant messaging service.

BACKGROUND OF THE INVENTION

There exists a growing popularity in instant messaging services. Instant messaging is a type of communication using the World Wide Web and/or the Internet to create a group to which members of the group utilize computing devices to communicate with each other via private chat transactions.

In some situations, certain information sent via instant messaging needs to be sent using a method that reduces the risk that someone will intercept the transmitted message or parts of a message and read the message.

Thus, a heretofore-unaddressed need exists for a solution that addresses the aforementioned deficiencies and inadequacies.

SUMMARY OF THE INVENTION

The preferred embodiments of the present invention provide systems and methods for instant messaging private tags.

Briefly described, in architecture, one preferred embodiment of the system, among others, can be implemented as follows. A system for implementing instant messaging private tags comprises a parser for parsing the instant message for sensitive data and tagging the sensitive data, an encryption engine for encrypting sensitive data that includes a modified uuencoder for converting the encrypted sensitive data into a data stream complying with an XML format. Elements for correspondingly parsing, uudecoding and decrypting are also preferably included.

The preferred embodiment of the present invention can also be viewed as providing methods for deploying instant messaging private tags. In this regard, one embodiment of such a method, among others, can be broadly summarized by the following steps: parsing a message for sensitive data; encrypting the sensitive data into an encrypted data stream; preferably converting the encrypted data stream to comply with an XML format; and tagging the encrypted and encoded sensitive data. Further, the embodiment preferably includes sending the data stream to a recipient processing device; parsing received data streams for the encrypted data stream; and if found, decrypting the encrypted data stream.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 4A and 4B are example messages depicting illustrative examples of encrypting sensitive data in an instant message in accordance with one embodiment of a privatize message system.

DETAILED DESCRIPTION OF THE PREFERRED EMBODIMENTS

Disclosed herein are systems and methods for deploying instant messaging private tags. To facilitate description of the inventive system, an example system that can be used to implement the systems and methods for deploying instant messaging private tags is discussed with reference to the figures. Although this system is described in detail, it will be appreciated that this system is provided for purposes of illustration only and that various modifications are feasible without departing from the inventive concept. After the example system has been described, an example of the operation of the system will be provided to explain one manner in which the system can be used to provide for the deployment of instant messaging private tags.

While several embodiments are described in connection with these drawings, there is no intent to limit the invention to the embodiment or embodiments disclosed herein. On the contrary, the intent is to cover all alternatives, modifications and embodiments. Additionally, while the following description and accompanying drawings specifically describe instant messaging private tags, it will be clear to one of ordinary skill in the art that the systems and methods presented herein may be extended to privatizing other messaging protocols such as voice-over Internet protocol (VoIP), E-mail, video conferencing, etc.

Figure 1:
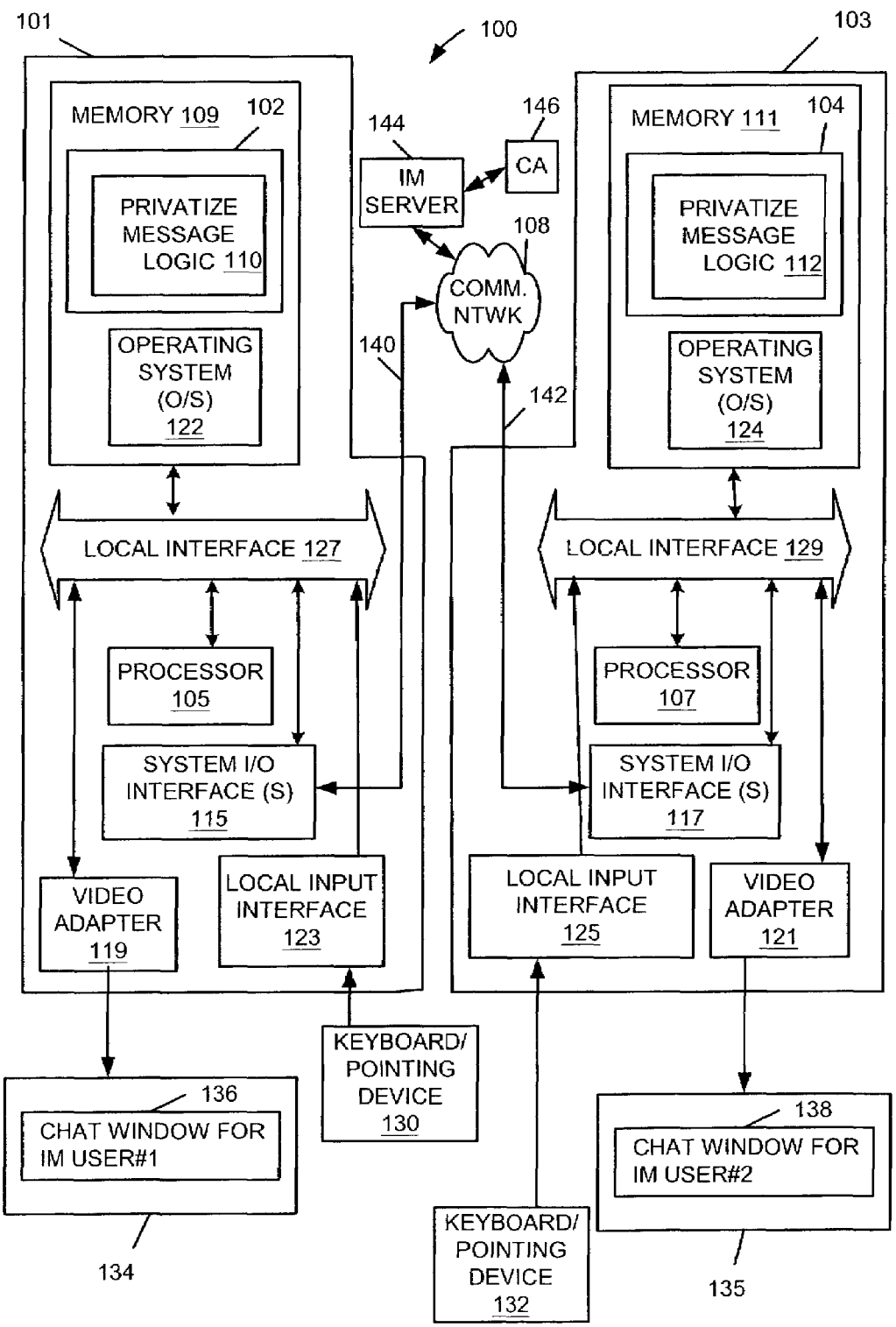
FIG. 1 is a block diagram depicting a preferred embodiment of a system in which instant messaging private tags may be implemented.

Referring now in more detail to the drawings, in which like numerals indicate corresponding parts throughout the several views, FIG. 1 is a block diagram depicting a preferred embodiment of a system 100 in which instant messaging private tags may be implemented. As shown in the nonlimiting example, a user having an IM configured processing device 101 wishes to have a chat session with another user having an IM configured processing device 103 utilizing a communications network 108. The communications network 108 may be any type of network employing any network topology, transmission medium, or network protocol. For example, such a network may be any public or private packet-switched or other data network, including the Internet, circuit-switched network, such as a public switched telecommunications network (PSTN), wireless network, or any other desired communications infrastructure and/or combination of infrastructure. In a preferred embodiment, the communications network 108 is configured as the Internet and communicates with Instant Messaging server(s) 144 (only one shown for simplicity) and a certificate authority (CA) 146 for processing services such as Instant Messaging and E-mail, among others.

The processing devices 101, 103 includes client applications 102, 104 (hereinafter referred to as client or clients) that can be implemented in software (e.g., programming stored on a medium, firmware, etc.), hardware, or a combination thereof. In the preferred embodiments, the clients 102, 104 are implemented in software as an executable program, and executed by a special or general purpose digital computer, such as a personal computer (PC; IBM-compatible, Apple-compatible, or otherwise), workstation, minicomputer, or mainframe computer.

Generally, in terms of hardware architecture, each processing device 101, 103 includes, inter alia, a processor 105, 107 and memory 109, 111. Input and/or output (I/O) devices 115, 117 (or peripherals), video adapters 119, 121, local input interfaces 123, 125 can be communicatively coupled to a local interface 127, 129. The local interface 127, 129 can be, for example but not limited to, one or more buses or other wired or wireless connections, as is known in the art. The local interface 127, 129 may have additional elements, which are omitted for simplicity, such as controllers, buffers (caches), drivers, repeaters, and receivers, to enable communications. Further, the local interface 127, 129 may include address, control, and/or data connections to enable appropriate communications among the aforementioned components.

The I/O devices 115, 117 may preferably include input devices, for example but not limited to, a keyboard, mouse, scanner, microphone, etc. In a preferred embodiment, a keyboard and/or pointing device 130, 132 is coupled to the local input interface 123, 125. Furthermore, the I/O devices 115, 117 may also include output devices, for example but not limited to, a printer, display, etc. In a preferred embodiment, a display 134, 135 is coupled to the video adapter 119, 121. In an example, the display 134, 135 is configured to include a chat window 136, 138. Finally, the I/O devices 115, 117 may further include devices that communicate both inputs and outputs to the network 108, for instance but not limited to, a modulator/demodulator (modem; for accessing another device, system, or network), a radio frequency (RF) or other transceiver, a telephonic interface, a bridge, a router, etc.

The processor 105, 107 is preferably a hardware device for executing software, particularly that stored in memory 109, 111. The processor 105, 107 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 109, 111 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 109, 111 may incorporate electronic, magnetic, optical, and/or other types of storage media. Note that the memory 109, 111 can have a distributed architecture, where various components are situated remote from one another, but can be accessed by the processor 105, 107.

The software and/or firmware in memory 109, 111 may include one or more separate programs, each of which comprises an ordered listing of executable instructions for implementing logical functions. In the example of FIG. 1, the software in the memory 109, 111 includes programming for displaying a chat window 136, 138, privatize message logic 110, 112, and a suitable operating system (O/S) 122, 124. The operating system 122, 124 essentially controls the execution of other computer programs, and provides scheduling, input-output control, file and data management, memory management, and communication control and related services.

The clients 102, 104 are preferably adapted to handle normal IM functions that may include handling conversion of IM functions from various protocols into XML-structured information. The clients 102, 104 include software applications that assists a user in communicating with contacts via an IM session. In this regard, the clients 102, 104 may be stored in a personal computer, a handheld computer, a cellular telephone having IM capabilities, an i-pager, or any network-compatible device.

The clients 102, 104 include programming for displaying a chat window 136, 138 in which a message can be displayed. In an example, User1 wishes to have a chat session with User2. Responsive to input from User1, a message is displayed in User1's chat window 136. The message is sent via a path 140 over the communications network 108. IM server(s) 144 of the communications network 108 process the chat message and the message is sent via path 142 to User2's IM processing device 103 and displayed at User2's chat window 138.

In a preferred embodiment of the invention, privatize message logic 110, 112 is configured to encrypt at least a portion of IM messages having sensitive data sent by participants in an IM chat session and decrypts the encrypted message received by participants in the IM chat session. Preferably, any encryption and decryption occur in the client 102, 104 utilizing the privatize message logic 110, 112. It is to be understood that the invention is not limited to only encrypting and decrypting messages involved in a chat message. Other messages can also be encrypted and decrypted utilizing the invention, including but not limited to E-mail, and other messaging protocols such as voice-over Internet protocol (VoIP), video conferencing, etc.

In one preferred embodiment of the invention, sensitive data in a chat session is automatically identified and encrypted before being sent over the communications network 108. Upon receipt of the encrypted message, the sensitive data in the message is decrypted before display by the chat window 136, 138. Sensitive information can include data such as email addresses and/or financial information. In another preferred embodiment, a user of the system selectively chooses which information will be encrypted before transmission over the communications network 108. The recipients having the proper authorization will be able to view at least a portion of the message upon receipt. Recipients not having the proper authorization will be unable to view at least a portion of the message. Other embodiments include both user-selectable and automatic identification and encryption of sensitive data.

Figure 2:
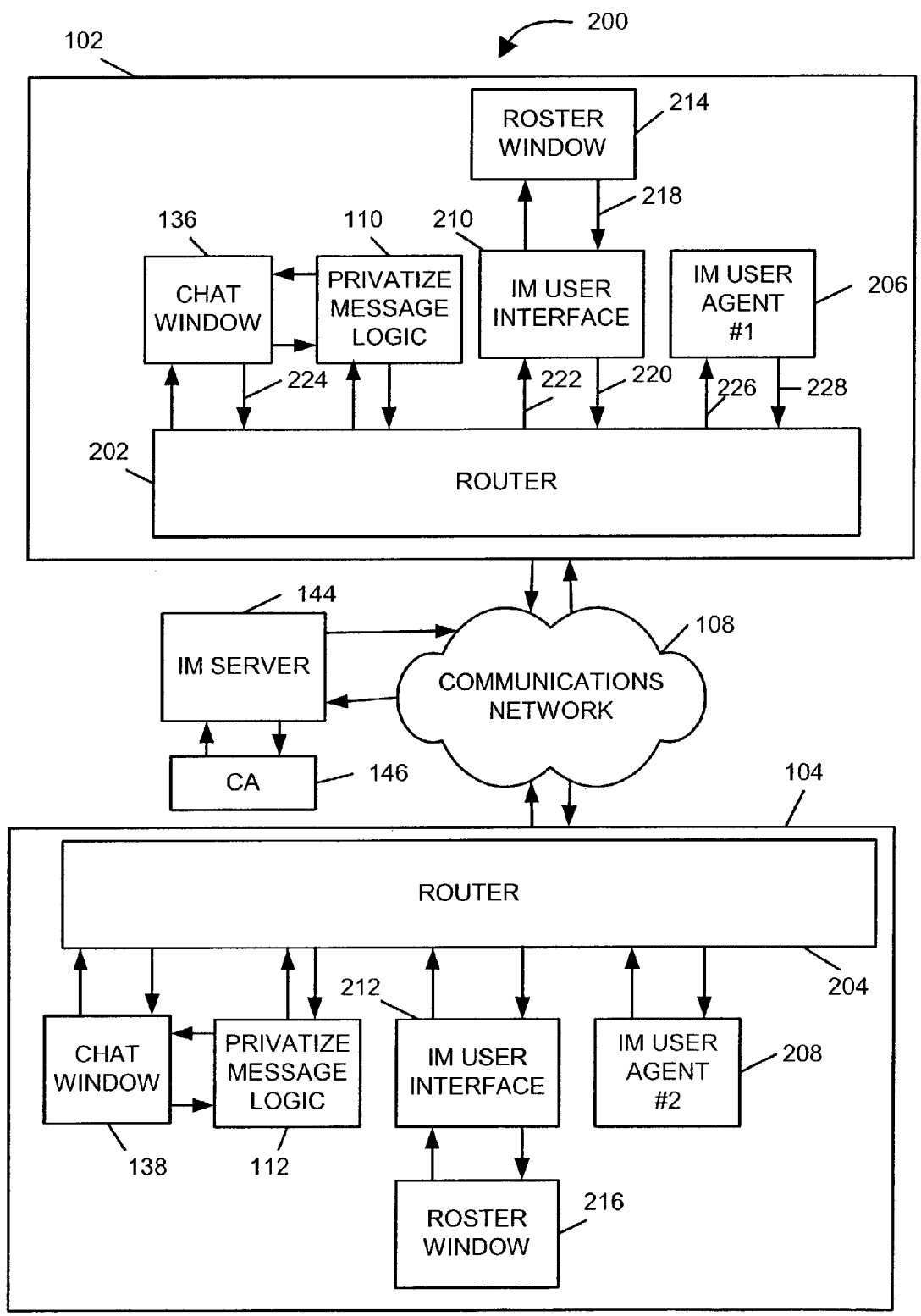
FIG. 2 is a block diagram depicting a preferred embodiment of a system for implementing instant messaging private tags.

FIG. 2 is a block diagram depicting a preferred embodiment of a system 200 for implementing instant messaging private tags. In the example shown in FIG. 2, two users communicate with each other utilizing IM, however the invention is not limited to only two users. In an example, the system 200 includes IM clients 102, 104 with private message logic 110, 112, communications network 108, routers 202, 204, IM User Agent #1 206, IM User Agent #2 208, IM user interfaces 210, 212, roster windows 214, 216, chat windows 136, 138, and IM server 144. In an example embodiment, the various components 102, 104, 136, 138, 202, 204, 206, 208, 210, 212, 214, 216, may be seen as software modules, which are launched by users on a personal computer 101, 103 (or other programmable device (not shown)). In another embodiment, the various components 102, 104, 136, 138 202, 204, 206, 208, 210, 212, 214, 216, may be seen as software objects in a distributed network, which are instantiated and destroyed by appropriate software commands. Since instantiation and destruction of objects in a distributed network is well known, further discussion of object instantiation and destruction is omitted.

In one embodiment, the various components 102, 104, 136, 138, 202, 204, 206, 208, 210, 212, 214, 216 of FIG. 2 are software modules on a user's personal computer. In this regard, the software modules are installed on a user's personal computer and, thereafter are launched by users. During installation of the software modules, each user is queried for the user's login names and passwords for all of the user's IM accounts. The login names and passwords for the user's IM accounts are stored in a login database (not shown) for subsequent use by the software modules.

Upon installation of the software modules onto the personal computer, a user launches the router 202 (or 204) such as by running an IM application from a desktop, etc. The router 202, 204 generates commands to launch the IM user agent 206 (or 208). In a preferred embodiment, the IM user agent 206, 208 performs as a background process. In response to generated commands, the various components 102, 104, 136, 138, 202, 210, 212, 214, 216 are launched as background processes.

The router 202, 204 is configured to track communications and route messages between the IM user agent #1 and #2 206, 208, IM user interface 210, 212 and chat windows 102, 104. In this regard, the router 202, 204 receives commands from the IM user agent #1, #2 206, 208, chat window 102, 104 and IM user interface 210, 212. Similarly, the router 202, 204 generates commands and directs the generated (or received) commands to the IM user agent #1, #2 206, 208, chat window 102, 104 and IM user interface 210, 212. Thus, in a general sense, the router 202, 204 receives information (e.g., commands, requests, data, etc.) and directs the received information to the appropriate software module.

In another embodiment, the various components 102, 104, 136, 138, 202, 204, 206, 208, 210, 212, 214, 216 of FIG. 2 are objects in a distributed network (not shown). In this regard, subsequent to installation of the software modules, when a user launches the router 202, 204, the router 202, 204 instantiates the IM user agent #1 206 (or #2 208), IM user interface 210, 212 and chat window 136, 104, and runs these objects on the client system (not shown) as background processes.

Regardless of whether the various components 102, 104, 136, 138, 202, 204, 206, 208, 210, 212, 214, 216 are launched as software modules or instantiated as distributed objects, once the various components 102, 104, 136, 138, 202, 204, 206, 208, 210, 212, 214, 216 are running as background processes, the router 202, 204 launches an IM user interface 210, 212. Upon selection of the IM user interface 210, 212, the router 202, 204 instantiates the IM user interface 210, 212, which queries the user for the user's IM login name and password.

The IM user agent 206, 208 receives the login name and password and looks up the login database (not shown) to determine whether or not the login name and password are valid (i.e., whether or not the login name and password are located in the login database). If the login name and password are valid, then the IM user agent 206, 208 retrieves login names and passwords for all of the user's IM accounts.

Upon retrieving the login names and passwords of all the user's IM accounts from the login database, in some embodiments, the IM user agent 206, 208 logs into each of the user's IM accounts through the IM server 144 using the respective login names and passwords for each of the user's IM accounts. The logging into various IM accounts through an IM server is described in detail in U.S. provisional patent applications serial Nos. 60/411,336 and 60/419,613, and U.S. patent application Ser. Nos. 10/274,408, 10/274,478 and 10/274,405, which are incorporated herein by reference as if set forth in their entireties. Thus, further discussion of logging into various IM accounts is omitted here.

Upon logging into the various IM accounts, the IM user agent 206, 208 obtains Internet presence information for all of the user's IM contacts as described in U.S. provisional patent applications serial Nos. 60/411,336 and 60/419,613 and U.S. patent application Ser. Nos. 10/274,408, 10/274,478 and 10/274,405, which are incorporated herein by reference as if set forth in their entireties. Thus, further discussion of obtaining presence information for contacts is omitted here.

Upon logging into the user's various IM accounts and retrieving the Internet presence information of the user's contacts, the IM user agent 206, 208 generates a command to the router 202, 204 to display the retrieved IM information. Upon receiving the command to display the retrieved IM information, the router 202, 204 requests the IM user interface 210, 212 to instantiate a roster window 214, 216 for displaying the user's contacts and the contacts' respective IM Internet presence information. The IM user agent 206, 208 conveys the IM information having the contacts' names and contacts' IM Internet presence information to the router 202, 204. The router 202, 204 further conveys the IM information to the IM user interface 210, 212, which displays the IM contact names and their respective IM Internet presence information to the user at the roster window 214, 216. Thus, at this point, all of the contacts and their respective IM Internet presence information are available to the user at the roster window 214, 216.

An option that is provided to the user at the roster window 214, 216 is the option to chat with a contact. In operation, the user's IM contacts and their respective IM Internet presence information are displayed to the user at the roster window 214, 216. Upon receiving a selection of one of the IM contacts by the user, the roster window 214, 216 generates a request, for example request 218, to the IM user interface 210 to generate a chat window 136, 138. The request 218 includes information related to the selected contact. The IM user interface 210 conveys the request 220 to the router 202, which receives the request 220 and generates a command 222 to the IM user interface 210 to instantiate the chat window 136. The command 222 includes a pointer to the IM user agent 206. The IM user interface 210, in response to the command 222 from the router 202, instantiates the chat window 136. Upon being instantiated, the chat window 136 issues a request 224 to the IM user agent 206 to request 226 the establishment a chat session with the selected contact, for example a user logged into IM accounts at IM user agent #2 208. For example, a request 228 from the IM user agent #1 206 to the router 202 can initiate a chat session. Since the initiation of chat sessions at chat windows is well known in the art, further discussion of initiating chat sessions at chat windows is omitted.

In a preferred embodiment, the system shown in FIG. 2 permits a user to initiate a chat session and engage in a chat session with any of the contacts equipped with privatize message logic 110, 112 regardless of the contacts' IM account (e.g., BellSouth™ IM account, AOL™ IM account, Yahoo™ IM account, MSN™ IM account, among others). In other embodiments, the chat session occurs between users utilizing IM accounts provided by the same service provider, and still other embodiments include only one user having the encryption capabilities discussed herein. Greater details related to IM chatting with various contacts at various IM accounts may be found in U.S. provisional patent applications serial Nos. 60/411,336 and 60/419,613, and U.S. patent application Ser. Nos. 10/274,408, 10/274,478 and 10/274,405, which are incorporated herein by reference in their entireties.

In the environment of a group chat, one message can be sent and received by each recipient user. The message will preferably be displayed at the display device of the recipient user having a client configured with the privatize message logic 110, 112 for decrypting the message. The client for each recipient will perform the functions described above such that the message is displayed, assuming the recipient user has the privatize message functionality of some embodiments of the present invention.

In a preferred embodiment, the certificate authority (CA) 146 is coupled to the IM server 144 or stored in a memory. The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the IM server 144.

Preferably, the CA 146 stores decryption key information. In an example, a user can make a key or keys available to other individual users. The individual users preferably have the option to accept or reject the key. If the individual users accept the key, in a preferred embodiment, the key will be stored for this user at the user location and/or in the CA 146. When an encrypted message is sent requiring the key for decrypting, the CA 146 preferably, though not necessarily, knows which individual users have been authorized the key, and only those users will be able to view the message. In one embodiment, keys are locally stored in O/S 122, 124, which typically requests user acceptance. Other embodiments include simply authorizing users without requiring their acceptance. Also, some embodiments include no CA 146, but simply have one key for all clients with no user-specific keys or controls of which text is protected.

In a preferred embodiment, the system shown in FIG. 2 permits a user to initiate a chat session and engage in a chat session with any of the contacts regardless of the contacts' IM account (e.g., BellSouth™ IM account, AOL™ IM account, Yahoo™ IM account, MSN™ IM account, among others). Greater details related to IM chatting with various contacts at various IM accounts may be found in U.S. provisional patent applications serial Nos. 60/411,336 and 60/419,613, and U.S. patent application Ser. Nos. 10/274,408, 10/274,478 and 10/274,405, which are incorporated herein by reference in their entireties.

Figure 3:
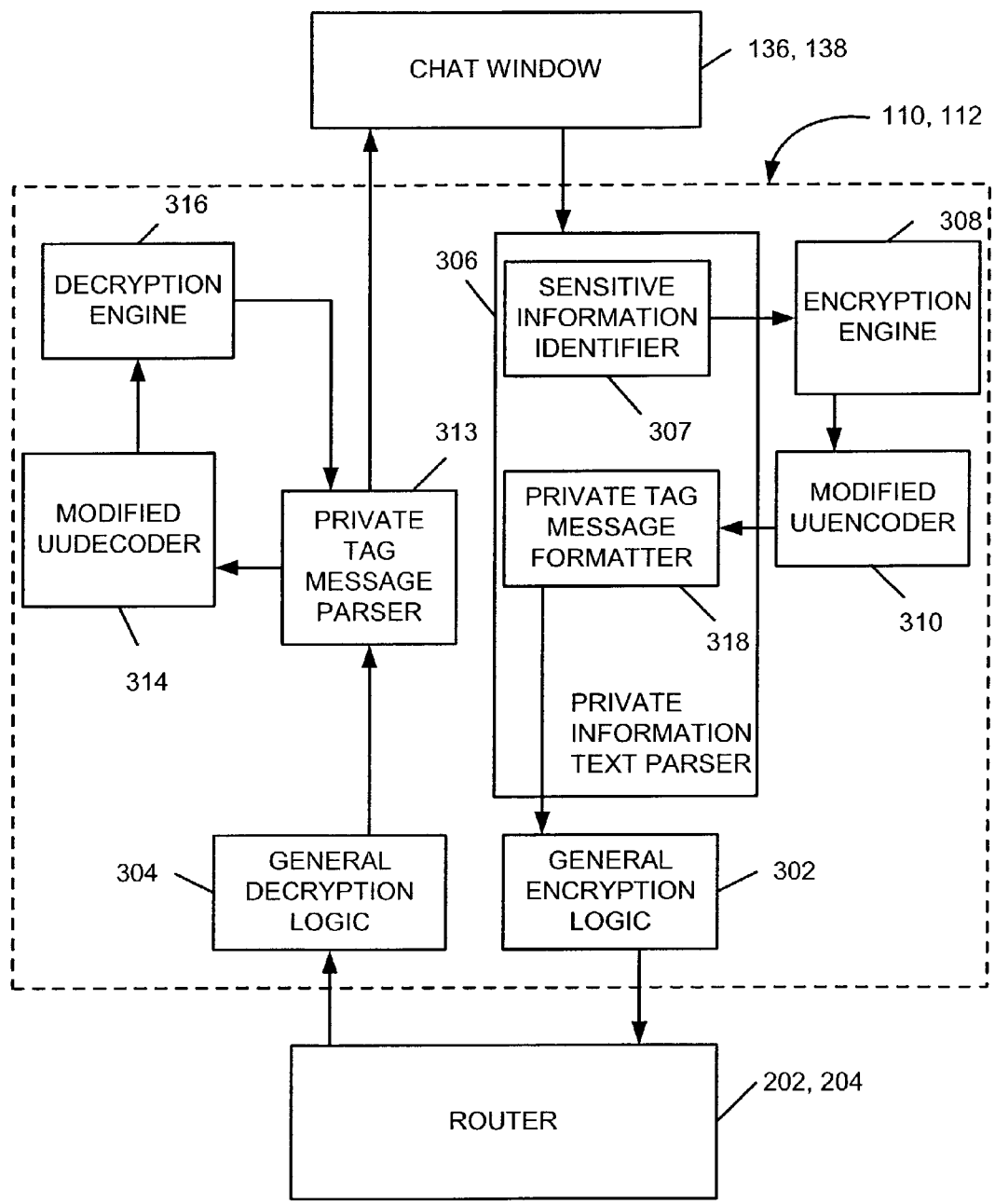
FIG. 3 is a block diagram depicting a preferred embodiment of a system for encrypting and decrypting sensitive data in an instant message.

FIG. 3 is a block diagram depicting a preferred embodiment of a system for encrypting and decrypting sensitive data in an instant message. The privatize message logic 110, 112 includes general encryption logic 302 and general decryption logic 304, a private information text parser ("text parser") 306, an encryption engine 308 and a modified uuencoder 310. In some embodiments, the privatize message logic 110, 112 further includes components for decryption of sensitive data including a private tag message parser ("message parser") 313 that couples to the general decryption logic 304, a decryption engine 314 and a modified uudecoder 314.

Referring to the encrypting portion of the privatize message logic 110, 112, the text parser 306 preferably includes a sensitive information identifier 307 configured to read the instant message and to apply rules for automatically identifying sensitive data. Other embodiments include detecting text identified by a user to be encrypted. In an example, the rules for automatic identification include searching for sensitive data that includes, but is not limited to, symbols such as #, -, @, and hexadecimal numbers, and/or searching for data marked as private by the sender. The text parser 306 also looks for patterns to pass over, like "(" for skipping over telephone numbers. The text parser 306 will also identify the entire phrase sequence, which is terminated by a sequence of a space and a letter, for example. These data items are identified because they may be a part of financial data such as bank account or credit card numbers, social security numbers, telephone numbers or E-mail addresses. In an embodiment, a user may not wish to have this information sent over the communications network 108 unencrypted and thus the text parser 306 searches for these kinds of sensitive data.

Once sensitive data is found utilizing for example, the sensitive information identifier 307, the sensitive data is passed through the encryption engine 308 that encrypts the sensitive data. Suitable encryption engines include those with Microsoft™ Crypto API, among others, and encryption algorithms may also include those by RSA Corp. of Redwood, Mass., such as SSL, etc., and Blowfish by Counterpane Labs of Cupertino, Calif., among others. Encryption type and key information may also be passed to the encryption engine 308 and later indicated in a private start tag, as discussed below. In a preferred embodiment, each data element is encrypted into a bit range of representative values that could involve a non-XML compliant data stream. For example, XML does not allow symbols such as &, ', ", <, >, space or commas as data, because these symbols have special meanings in XML. Since preferred embodiments utilize XML compliant data streams in transmission, the encrypted data is also passed through a modified uuencoder 310. In an example, the modified uuencoder 310 includes an algorithm that converts the non-XML compliant encrypted data stream into an encrypted data stream that fits within an XML stream, as well as complying with 7-bit restraints of servers in some transmission networks, the expected result of the uuencoding algorithm. In an embodiment, the unallowed symbols are replaced with a \ (backslash) and a hexadecimal equivalent of the symbol. The resultant encrypted/encoded data is then tagged as part of the message by a private tag message formatter 318, which inserts a "<private>" starting tag, preferably with an "enc=" name/value pair designating an encryption type and a key identifier before encrypted/encoded data, and a "<\private>" ending tag after the encrypted/encoded data. The message is also then preferably encrypted utilizing general encryption logic 302 (such as with SSL) before being routed and sent to router 202, 204 for sending the message over the Internet using any known Instant Messaging protocol.

In one implementation of the encryption/encoding process, text data entered by a user as a message is stored in RAM, as put there by chat window 136, 138. Then, pointers to the message are passed to the text parser 306, which automatically (in one embodiment) identifies sensitive data and sends pointers to that data to the encryption engine 308. The encryption engine 308 pulls data into CPU registers, encrypts the sensitive data and then writes the encrypted sensitive data preferably to RAM as modified uuencoded data (in this case modified uuencoder 310 is part of a modified encryption engine 308 for inline, modified uuencoding, but does not need to be) and then writes back to RAM. Text parser 306 then re-writes the entire message in RAM, including newly inserted tags and encrypted/encoded data from other memory locations pointed to by encryption engine 308. The message encrypter 302, preferably SSL, encrypts entire message before sending the message to router 202, 204.

In an embodiment where a user sends an encrypted message to a user at chat window 138, the privatize message logic 110, 112 can be utilized to decrypt encrypted messages received at the chat window such as chat window 138 in the system shown in FIG. 1. In an example, messages are received at the router 202, 204. General decryption logic 304 decrypts the message and sends it to the message parser 313. The message parser 313 searches the message streams for encrypted sensitive data streams. Once found, the encrypted sensitive data streams are sent to the modified uudecoder 314. The modified uudecoder 314 includes an algorithm that converts the XML compliant encrypted/encoded data stream into a uudecoded data stream. The data stream is then sent to the decryption engine 316, which decrypts the data stream utilizing any "enc" and "key" values, as shown below. Suitable decryption engines 316 include Microsoft™ Crypto API, RSA, Blowfish, among others. In an example, the decryption engine 316 utilizes keys provided by the above reference algorithms to translate the encrypted data and provide decrypted data out of the decryption engine 316. In some embodiments, both entire message SSL key and automatically identified sensitive data keys are stored at the client location automatically after installation. Modified uudecoder 314 and decryption engine 316 are passed sensitive encrypted/encoded data identified by private tags. The decrypted message is sent to the message parser 313. The message parser 313 preferably sends the unencrypted/unencoded message to the chat window 136, 138 for display.

FIGS. 4A and 4B are example messages depicting illustrative examples of encrypting sensitive data in an instant message in accordance with one embodiment of a privatize message system in which account information is privatized. Referring to FIG. 4A, a message having sensitive data is shown. The message begins at line 402 with a "<root>" tag, which describes the root element of the message. Line 404 indicates the beginning of the message with a "<message>" notification. Line 406 describes the text of the message, i.e., "Todd's Acct: 123-456." The message ends at line 408 with message end tag "<message>." The message ends at line 410 with ending tag "</root>." Based on rules established in the text parser 306, the numbers "123-456" include sensitive data that should be removed and replaced by encrypted data.

Referring to FIG. 4B, the sensitive data is encrypted and surrounded by private tags. The message begins at line 402 with a "<root>" tag, which describes the root element of the message. Line 404 indicates the beginning of the message with a "<message>" notification. Line 407 describes the beginning text of the message, i.e., "Todd's Acct:." In a preferred embodiment, the information after the words Todd's Acct: will be blank and unviewable to those who do not have the proper key to decrypt the message. At line 409, the information is indicated as private by starting private tag "<Private enc="Blowfish" Key ID=Todd">." This private starting tag indicates that the message is private and encrypted, the encryption ("enc") engine is "Blowfish" and the key to decrypt the message is "Todd." Line 412 shows that Todd's account number "123-456" has been removed and replaced with "%#159" which as an illustrative example represents "123-456." Line 414 ends the private message with ending private tag "/Private>." The message ends at line 408 with message end tag "</Message>." The message ends at line 410 with ending tag "</Root>." In a preferred embodiment, Todd's account information of line 406 has been replaced with lines 410-414.

Figure 5:
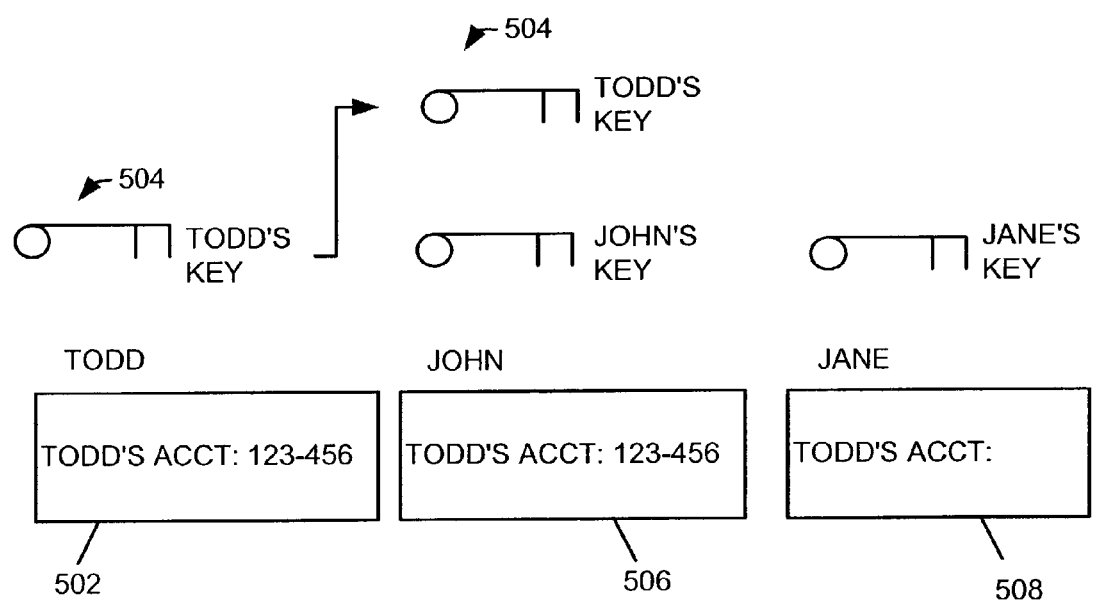
FIG. 5 is a block diagram depicting an illustrative example of encrypting sensitive information in one implementation of a privatize message system.

FIG. 5 is a block diagram depicting an illustrative example of encrypting sensitive information in one implementation of a privatize message system with user-selectable authorizations. In an example, Todd broadcasts account information 502 to other users John and Jane. Since Todd's account information contains numbers, it is encrypted before being sent to John and Jane. In an embodiment, Todd has previously made his key available to John. A user, such as Todd, exercises an option at the roster window 214, 216 or other suitably equipped display, to generate keys. Preferably, the keys are generated by client 102, 104 utilizing a universal unique identification generator (UUID). The client 102, 104 performs a call to a UUID program such as one provided by Microsoft™. By utilizing the roster window 214, 216 Todd can assign the generated keys to particular contacts. Thus, Todd can selectively offer the key to specific contacts. Some embodiments include general authorization to all users on a system to see automatically identified sensitive information. In an example, Todd creates multiple keys for different sections of an instant message such that particular sections have different keys from other sections thereby allowing Todd to determine who can decrypt which portion of the message by distribution of different keys. For example, one key can be used for financial information like a social security number and another key can be used for simple messages. In some embodiments, one contact has multiple keys.

In an example, Todd's key 504 information and the fact that John has Todd's key 504 is stored in the CA 146. Preferably, Todd's key is stored at John's processing device in an operating system after Todd initially designates John as a key recipient. The IM server 144 tracks key information and provides Todd with information regarding who has key authorizations. Upon finding Todd's key 504, it is used to decrypt the sensitive information, i.e., Todd's account numbers 123-456, and Todd's account is displayed at John's chat window 506 or other display device. In an alternative embodiment, Todd provides John with the key, and John manually enters the Todd's key information into a processing device in order to display Todd account information.

In this example, Todd did not provide the key information to Jane. A search of the CA 146 will not reveal Todd's key associated with Jane. Thus, the sensitive information, i.e., Todd's account numbers 123-456, will not be displayed at Jane's chat window 508 or other display device. In a preferred embodiment, Jane will see the message "Todd's Acct:" however, the account number will not be revealed. In another embodiment, Jane will not see a reference to Todd's account.

Figure 6:
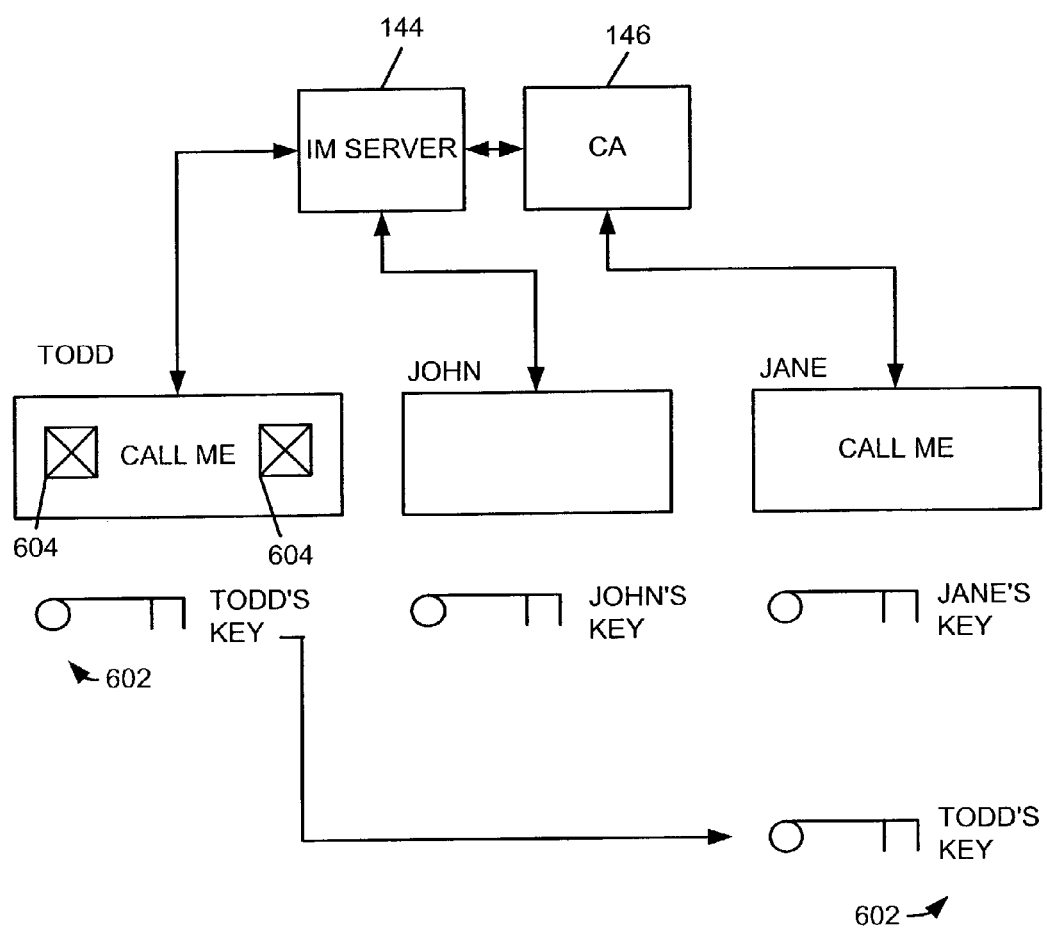
FIG. 6 is a block diagram depicting an illustrative example of selective key distribution in one implementation of a privatize message system.

FIG. 6 is a block diagram depicting an illustrative example of selective key distribution in one implementation of a privatize message system. In an example, a user, for example Todd has selectively given his key to an individual user, for example, Jane, such that only that user can view the encrypted message. Todd's key 602 has been offered to Jane, and she has accepted his key. This information is stored in the CA 146. Todd has not offered his key to John who therefore cannot decrypt the message.

Todd creates and sends an encrypted message "call me." In an example, Todd marks the message as private, for example Todd paints message with a mouse to select for marking, or as shown in FIG. 6, Todd selects a feature, such as by checking box 604 on a processing device that will mark the message as private. Todd is also preferably able to select among a plurality of available keys. In a preferred embodiment, Todd can select a portion of the message such as, individual words, phrases, sentences, paragraphs, among others, or mark the entire message as private. Preferred embodiments of this invention allows users in a group chat environment to selectively choose who receives a key and thus, who will see a message they wish to designate as private.

Thus, when Todd's message is sent, only Jane who has Todd's key 602 will be able to display the message. John will not be able to display Todd's message. As far is John is concerned, he may never know that Todd sent a message to Jane (and any others having Todd's key 602) saying, "call me."

The preferred embodiments of this invention provide for user selectable encryption and decryption of sensitive data or automatically encrypting and decrypting sensitive data or both.

Figure 7:
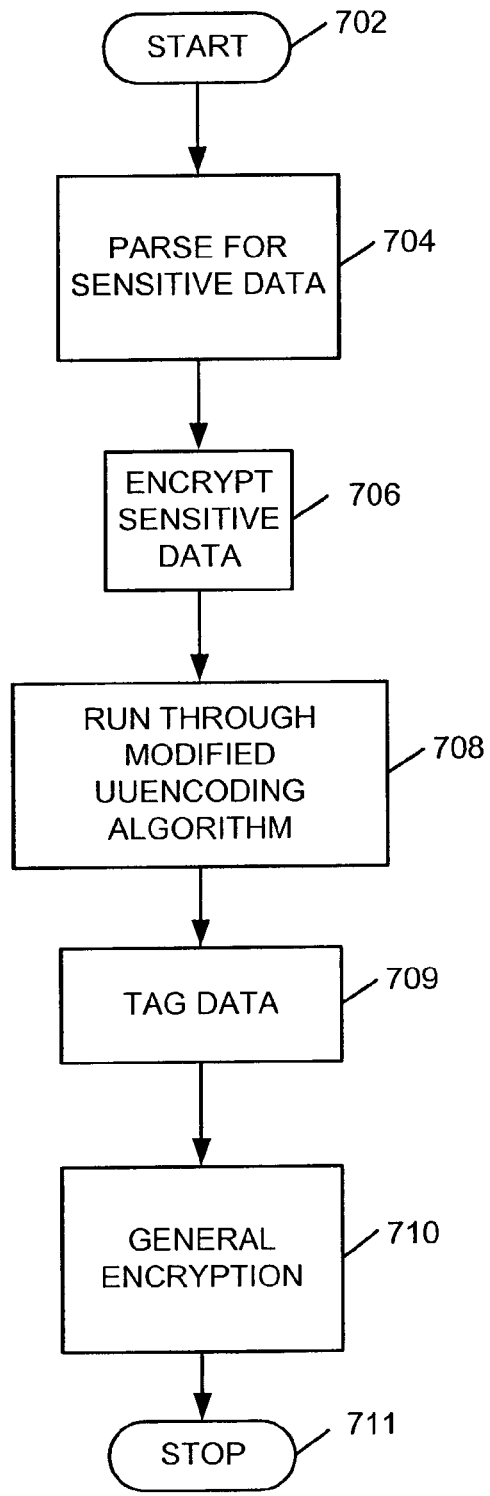
FIG. 7 is a flow chart depicting general functionality of a preferred embodiment for implementing encrypting sensitive data in a privatize message system.

FIG. 7 is a flow chart depicting general functionality (or method) of a preferred embodiment for implementing encrypting of sensitive data in a privatize message system. The process begins at 702. At 704, a message is parsed for sensitive data. Sensitive data can include numbers, or other designated data, and can include automating identified data or data selected by a user for encryption, or both. At 706, if found, any sensitive data is encrypted. At 708, the encrypted data is passed through a modified uuencoding algorithm to transform the encrypted data into an XML compliant format. The encrypted/encoded data is then tagged with private tags at 709. After an encrypting of the entire message at 710, the process ends at 711.

Figure 8:
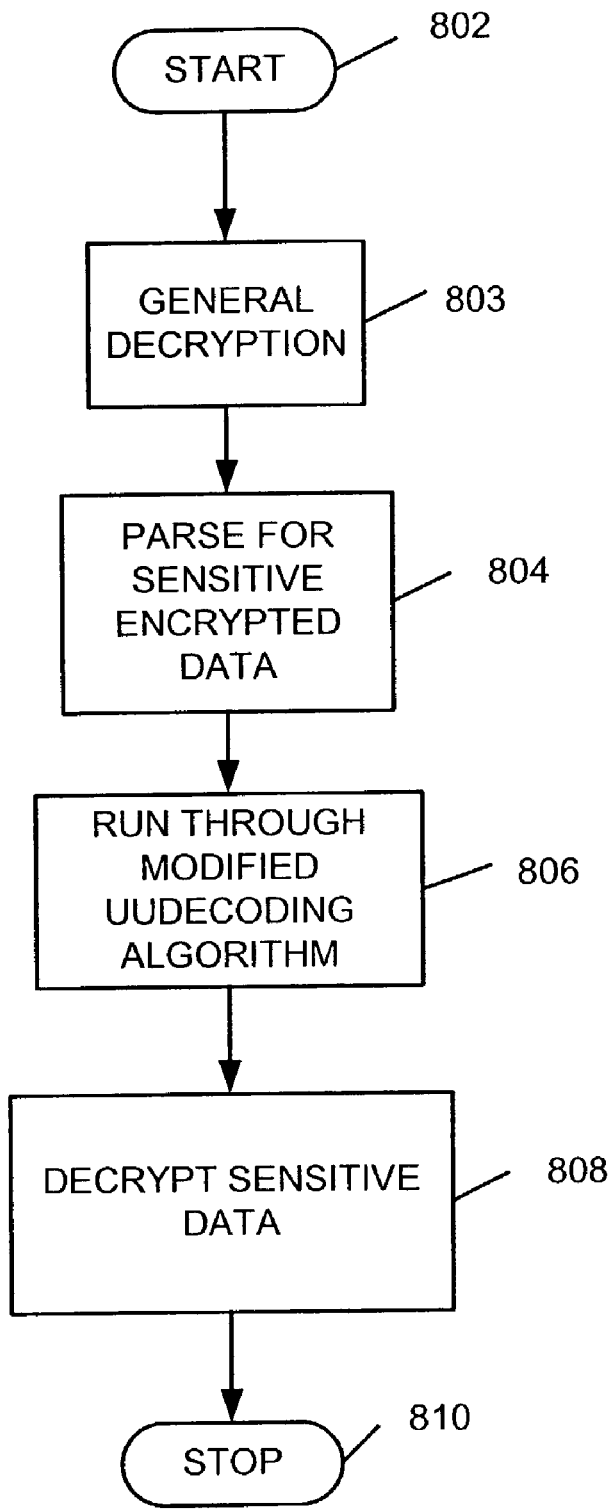
FIG. 8 is a flow chart depicting general functionality of a preferred embodiment for implementing decrypting of encrypted sensitive data in a privatize message system.

FIG. 8 is a flow chart depicting general functionality (or method) of a preferred embodiment for implementing a decrypting of sensitive data in a privatize message system. The process begins at 802. After an entire message decrypting in step 803, at 804, the data is parsed for sensitive encrypted data. At 806, if found, the sensitive encrypted data is uudecoded. At 808, the sensitive data is decrypted. The process ends at 810.

Figure 9A:
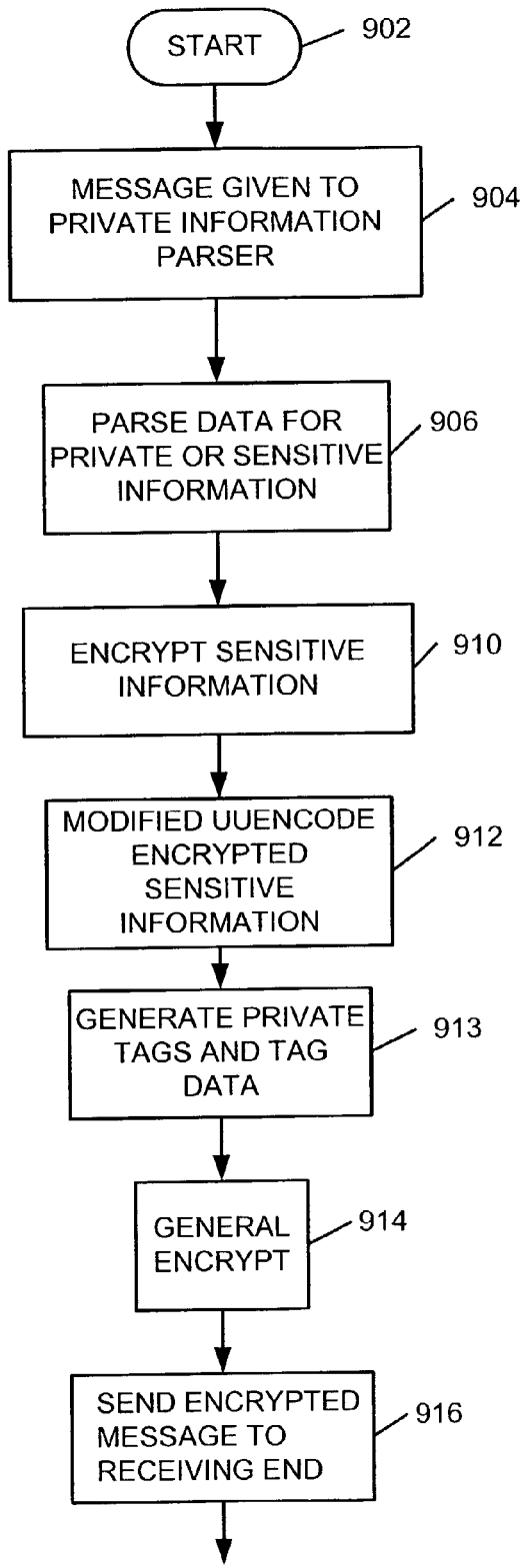
FIGS. 9A and 9B are flow charts depicting general functionality of a preferred embodiment for implementing a privatize message system.
Figure 9B:
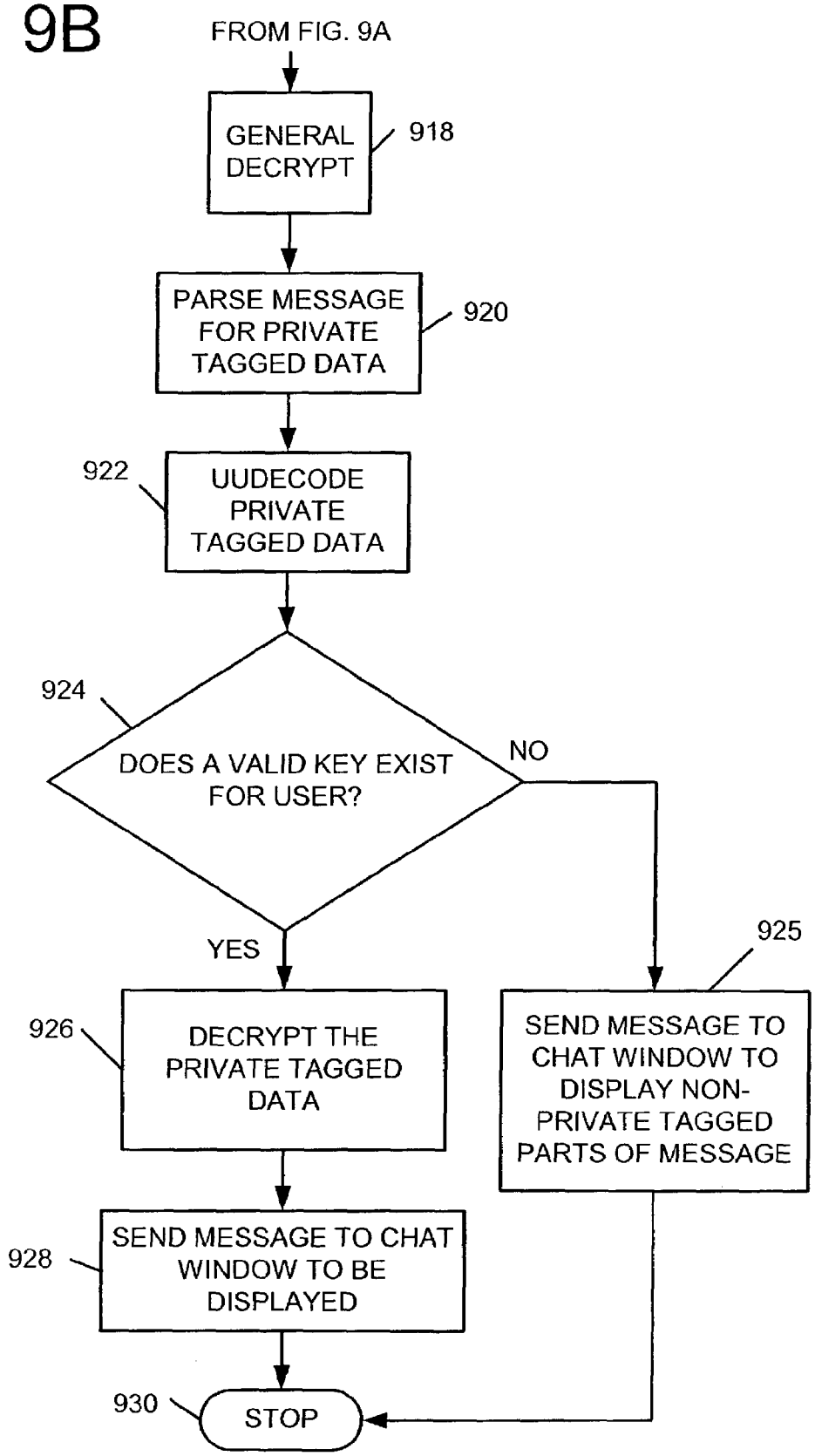

FIGS. 9A and 9B are flow charts depicting more specific functionality (or methods) of a preferred embodiment for implementing a privatize message system with user-selectable key authorization. The process begins at 902. At 904 a message is given to a private information parser. At 906, the message is parsed by the private information parser for private or sensitive information. The parser utilizes rules that specify when a message should be considered private. For instance, the message should be private if it contains a marker selected by a user or if the message contains numbers or hyphens, or both. At 910, the sensitive information is encrypted. At 912, a modified uuencoding is performed on the sensitive information. Modified uuencoding is performed to place the encrypted sensitive information in an XML compliant format. At 913, private tags and any tag data is generated (e.g., one or more of encryption type and identification of which encryption key was used, among others). The "<Private>" starting tag will mark the beginning and a "</Private>" ending tag will mark the end of the encrypted message. At 914, general encryption occurs. At 916, the encrypted private tagged data is sent to the receiving end. The process continues at FIG. 9B.

At 918, general decryption occurs. At 920, the received message is parsed for private tagged data. In a preferred embodiment, a private tag message parser removes the private tags themselves, but in other embodiments, the private tags are not removed, but are simply ignored by the chat window and not displayed. If private tagged data is found, at 922, the private tagged data is uudecoded. At 924, a determination is made as to whether a valid key exists for the user. If yes, at 926, the information contained in the private tagged data is decrypted utilizing the key. At 928, the decrypted message is sent to a chat window or other display device, to be displayed for the recipient. The process ends at 930. If no valid key exists for the user, at 925, the message is sent to the chat window to display non-private tagged parts of the message. The process ends at 930.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The preferred embodiment of the present invention provides systems and methods for securing private information that is transmitted in an instant messaging chat session. The present invention provides user with different levels of security for different sections of an instant message. This functionality includes systems and methods for selectively privatizing vital information when transmitting information that is destined for multiple users.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for privatizing an instant message, comprising:
   a first parser for parsing the instant message as entered in a chat window for identification of sensitive financial data, including bank account,
   credit card information, or social security information;
   an encryption engine for encrypting the sensitive financial data;
   a decryption engine configured to receive the data stream, the decryption engine including a uudecoder configured to convert the data stream into an XML compliant format message, and configured to determine if a valid key exists to decode the data stream and to decode the data stream utilizing the valid key;
   a communications network for sending and receiving data streams between processing devices;
   wherein the encryption engine further comprises a uuencoder for converting the encrypted sensitive data into a data stream complying with an XML format and is configured to generate a private tag that surrounds the sensitive data, the sensitive data configured as a space-letter sequence comprising at least one of numbers, hyphens, @symbol, or other specialized characters, and to encrypt the private tag utilizing an encryption method comprising at least one of RSA or Blowfish, among other algorithms;

a second parser for parsing the data stream received at a recipient processing device for encrypted data, the second parser configured to parse the data stream for the private tag comprising a name/value pair which informs the encryption engine of an encryption method to utilize to encrypt the private tag;

a display device coupled to processing devices for displaying the decrypted message; and selectable authorization keys assignable to particular contacts for decryption of the sensitive financial data;

wherein in-line uuencoding occurs before writing the encrypted and encoded data to memory in a processing device.

2. A system for providing instant messaging private tags, comprising:

a text parser for parsing a message as entered in a chat window for identification of sensitive financial data, including bank account, credit card information or social security number information;

an encrypter for encrypting the sensitive financial data;

an uuencoder for converting the encrypted sensitive financial data into an XML compliant format data stream;

a formatter for converting the data stream into a stream surrounded by private tags;and a private tag parser for parsing the private tag for a private tag marker.

3. The system of claim 2, further comprising a communications network for sending the privately tagged data to a processing device configured to receive the privately tagged data.

4. The system of claim 2, wherein the parser further comprises a set of rules for determining whether the message includes strings that contain at least one of numbers, hyphens, or @symbol.

5. The system of claim 2, wherein the encrypter further comprises an encryption engine.

6. The system of claim 2, further comprising a processing device configured to perform at least one of generating, sending, receiving or displaying the message.

7. The system of claim 2, further comprising: a uudecoder for converting the private tag having the private tag marker into an XML compliant data stream;

a decrypter for decrypting the data stream into a text message.

8. The system of claim 7, wherein the decrypter further comprises an decryption engine configured to utilize a valid key to decode the data stream.

9. A method for privatizing sensitive financial data in a message, comprising:

parsing the message as entered in a chat window for the identification of sensitive financial data, including bank account, credit card information, or social security number information;

encrypting the sensitive financial data into a data stream; and converting the data stream into tagged data that complies with an XML format.

10. The method of claim 9, wherein the sensitive data further comprises at least one of numbers, hyphens, or @symbol.

11. The method of claim 9, further comprising sending the tagged data to a recipient processing device.

12. The method of claim 11, further comprising:

receiving the tagged data;

decrypting the tagged data; and converting the tagged data into a text message that complies with the XML format.

13. The method of claim 12, further comprising displaying the text message on a display device.

14. The method of claim 12, wherein the decrypting the tagged data is performed utilizing a valid key for a recipient of the tagged data.

15. The method of claim 11, wherein the sending the tagged data to a recipient processing device is performed utilizing a communications network configured to send and receive tagged data.

16. The method of claim 11, wherein the sending the tagged data to a recipient processing device is performed utilizing an Instant Messaging protocol.

17. A method for providing instant messaging private tags, comprising:

receiving a tag in an instant message as entered in a chat window;

parsing the tag for identification of sensitive financial data, including bank account, credit card information, or social security number information;

encrypting the sensitive financial data into encrypted data; and converting a non-XML compliant portion of the encrypted data into an encrypted XML compliant data stream, wherein converting a non-XML compliant portion of the encrypted data into an encrypted XML compliant data stream generates a private tag.

18. The method of claim 17, further comprising:

receiving an encrypted data stream;

parsing the encrypted data stream for an encrypted non-XML compliant portion;

converting the non-XML complaint portion of the encrypted data stream into an XML compliant data stream; and decoding the XML compliant data stream into a text message.

19. The method of claim 17, further comprising passing the encrypted XML compliant data stream to an instant messaging transport protocol engine.

20. The method of claim 17, further comprising sending the encrypted XML compliant data stream over a communications network.

21. The method of claim 18, wherein the decoding the XML compliant data stream into a text message is performed utilizing a valid key.

* * * * *